Nov. 5, 1968     R. W. OTTAWAY ETAL     3,409,151
AUTOMATIC FEEDING MECHANISM
Filed Jan. 12, 1967     5 Sheets-Sheet 1

Inventors
Robert W. Ottaway
Paul G. Rumball
By their Attorney
Richard A. Wise

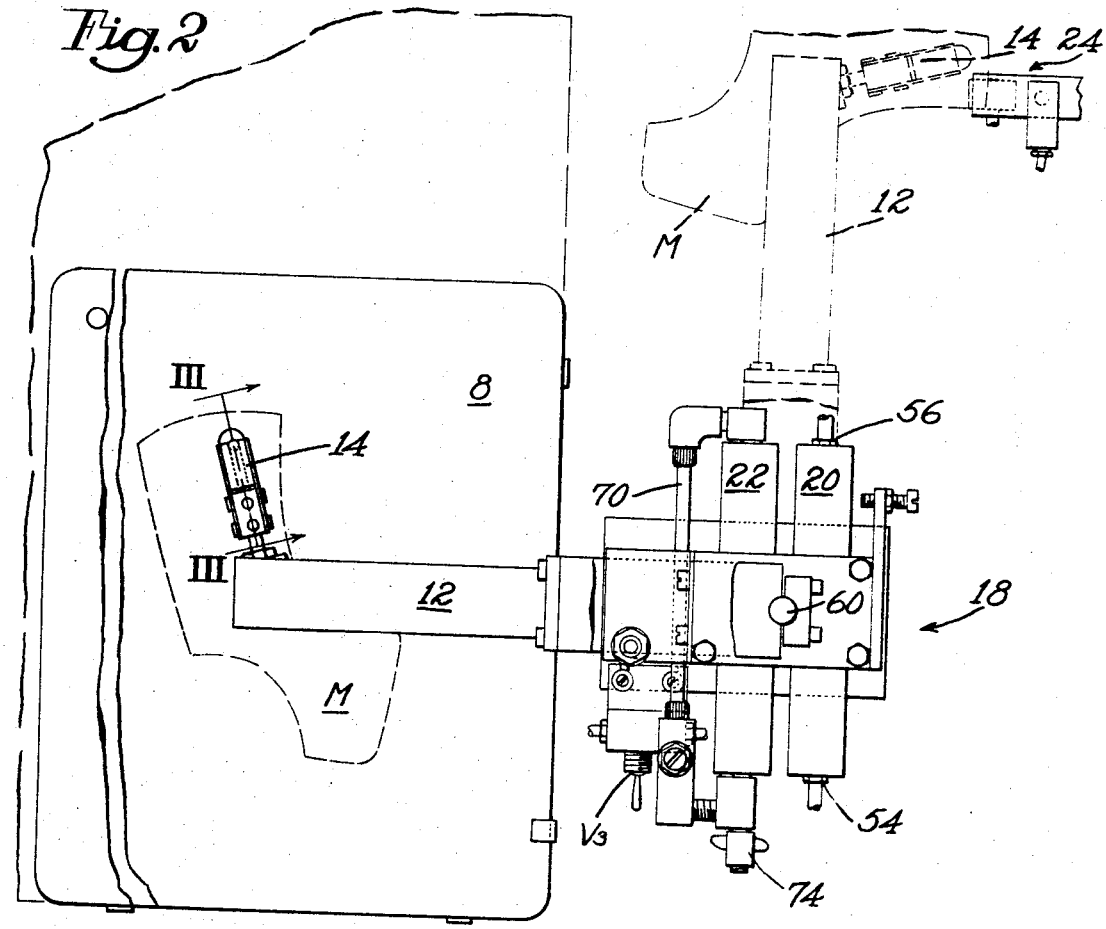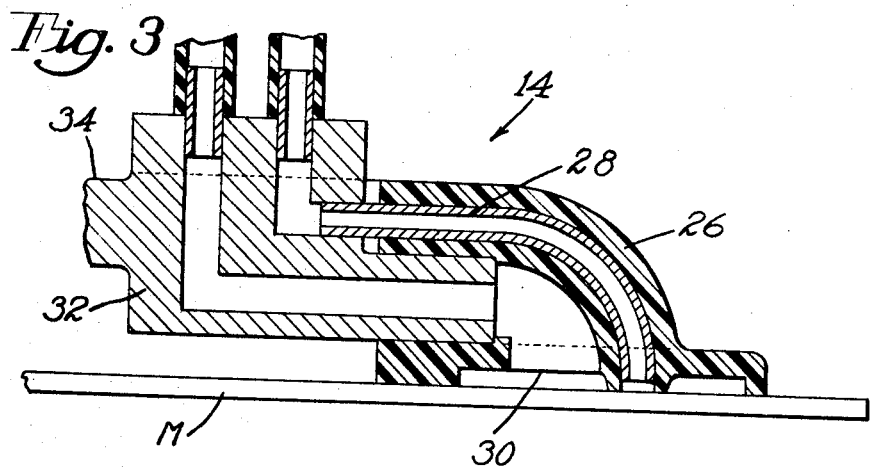

Nov. 5, 1968

R. W. OTTAWAY ETAL 3,409,151

AUTOMATIC FEEDING MECHANISM

Filed Jan. 12, 1967

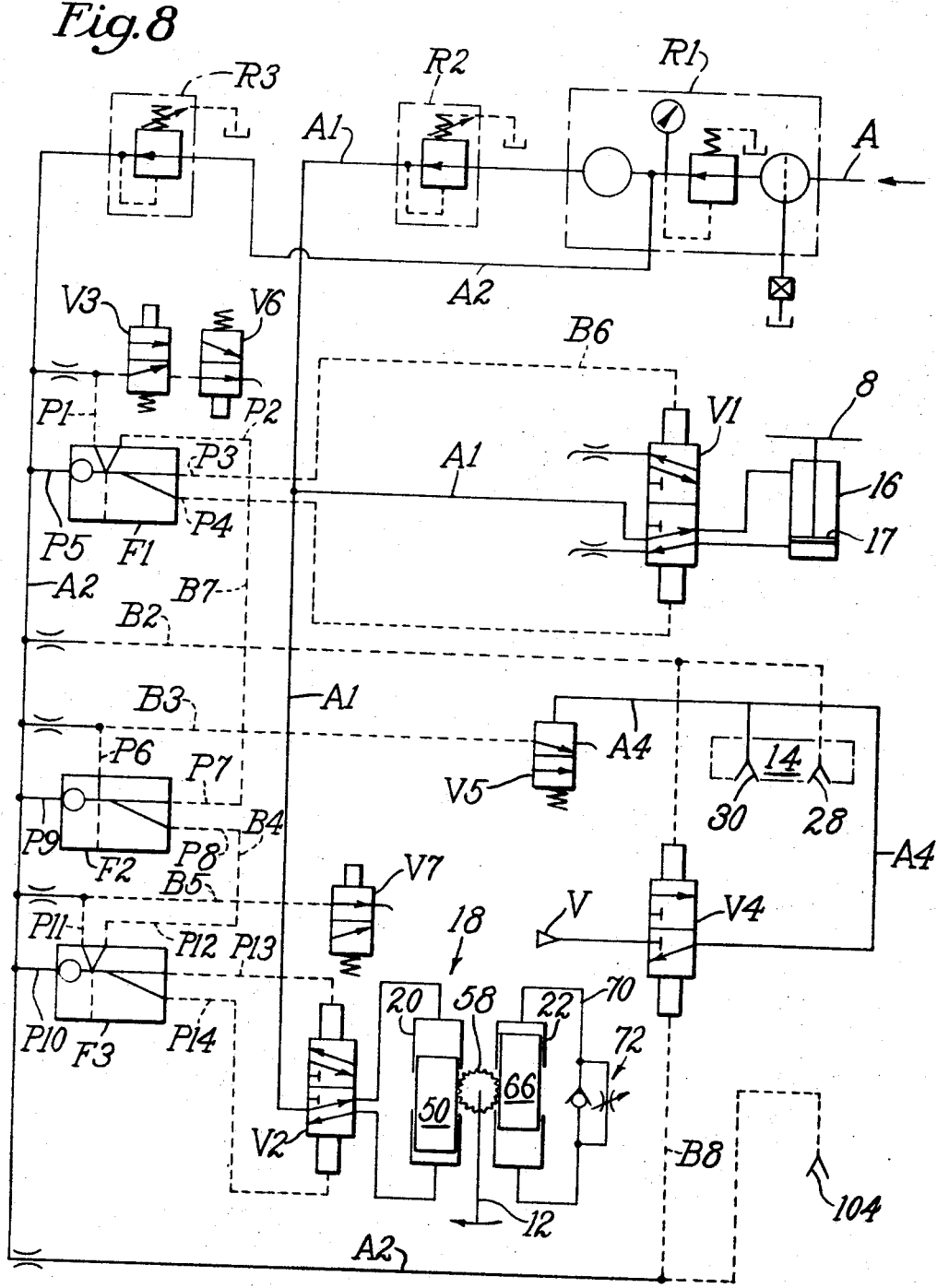

United States Patent Office 3,409,151
Patented Nov. 5, 1968

3,409,151
AUTOMATIC FEEDING MECHANISM
Robert W. Ottaway, South Hamilton, and Paul G. Rumball, Beverly, Mass., assignors to United Shoe Machinery Corporation, Flemington, N.J., a corporation of Massachusetts
Filed Jan. 12, 1967, Ser. No. 608,869
12 Claims. (Cl. 214—8.5)

ABSTRACT OF THE DISCLOSURE

An automatic feeding mechanism for a stack of flat workpieces which in combination includes a vertically reciprocable table and a horizontally oscillatable arm having a pickup head mounted upon its outermost end. The various elements are interconnected so that when the arm and attached head are located above the table, the table will move upwardly until the uppermost workpiece contacts the pickup head, whereupon the workpiece is picked up by the head and the table returned to its lower position. The arm now swings to feed the workpiece to a recipient device and then returns to complete the cycle.

Background of the invention

This invention relates to machines for operating on flat workpieces such as for example, shoe parts used in the manufacture of shoes. In particular, this invention is concerned with a novel and improved mechanism for picking up flat pieces, one by one, from a stack of workpieces, and placing them in a machine to be operated upon. While the novel mechanism is herein described in conjunction with a machine having piece receiving rollers, it is to be understood that the invention in its broader aspects is not limited to receiving means of this particular type.

In the manufacture of shoes, as well as in many other fields of manufacture, the production or finishing of various individual shoe parts is essentially done automatically. An operator many times is required to be stationed beside the automatic machine with no greater function than that of systematically placing individual pieces under the control of the machine.

Summary of the invention

It is an object of this invention to avoid the need for employment of a human operator to perform such a simple repetitious task. At the same time that this tedious task is taken away from a human, the job will be done more efficiently and reliably since it will be removed from the possibility of human error. With this object in mind and in accordance with the features of this invention, a table is provided which is designed to accommodate a stack of individual workpieces such as shoe parts of a variety of sizes or shapes. A fully automatic pickup device is mounted upon an arm above the table to remove a single workpiece from the top of the stack and retain control of the piece until the automatic machine being fed assumes positive control thereof. Upon yielding control to the machine, the arm returns to a position above the table to complete the cycle which is repeated until the stack is depleted.

More particularly, the workpiece handling system includes a table upon which stacking guides may be readily adjusted to accommodate workpieces of various sizes and shapes. The table is further designed to reciprocate in a vertical direction, the reciprocation being coordinated with the movement of the pickup device. The pickup device comprises an arm which is oscillatable in a horizontal plane and which has mounted on its outermost end a pickup head. As will presently appear, when the arm is in a position above the table, the table moves upwardly until the uppermost workpieces of a stack of workpieces thereon is sensed by the pickup head, the pickup head then takes positive control of the uppermost workpiece, and the table returns to its lowest position. When the table reaches its lowest position the arm swings in a direction to carry the single workpiece to the receiving means of the associated machine. A sensing device at the machine now causes the pickup head to release the workpiece. Having thus yielded control of the workpiece to the machine, the arm swings back to the "home" position above the table. It will be noted that the various elements are so interconnected that the foregoing sequence of operations will continue until the stack of workpieces is depleted. In the illustrative mechanism the operating elements are actuated by fluid pressure motors controlled by means of a pneumatic system incorporating fluidic elements.

The above and other features of the invention including various novel details of construction and combinations of parts will now be more particularly descriped with reference to the accompanying drawings and pointed out in the claims.

Brief description of the drawings

The invention will be described further in connection with the attached drawings in which:

FIG. 2 is a plan view of the device of FIG. 1 showing the arm in a second position in phantom lines;

FIG. 3 is a cross-sectional view on the lines III—III of FIG. 2 on an enlarged scale of the pickup head;

FIG. 8 is a pneumatic diagram showing the operating motors and interconnecting control circuitry.

General description

Figure 1:
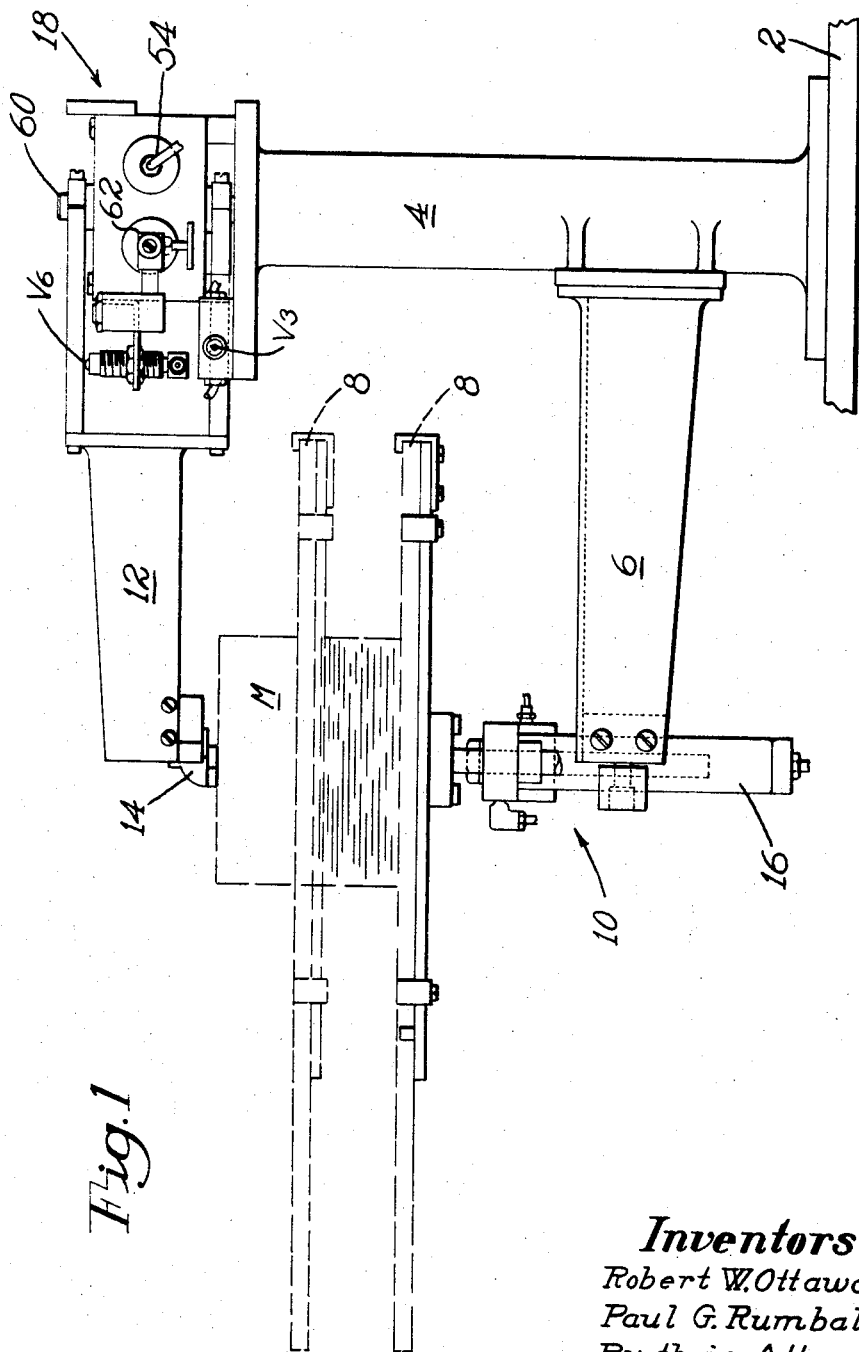
FIG. 1 is a side elevation of the automatic feeding device including the table and arm.

As seen in FIGS. 1 and 2, the automatic workpiece feeding device is a unit independent of any particular machine. The automatic feeder is connected to an available source of compressed air and to the receiving machine in a manner to be activated when the machine is ready to receive another piece of material.

The feeding device (FIG. 1) comprises a base 2 which may be made portable, and mounted upon this base is a rigid vertical pillar 4 which supports the entire feeding mechanism. In general, the feeding mechanism comprises a rigid arm 6 attached to the pillar 4 which supports a work holding table 8 and its controlling mechanism. A horizontally rotatable pickup arm 12 is mounted above the rigid arm 6 on the pillar 4 and a pickup head 14 is carried by this arm. The table 8 is vertically reciprocable to permit the rotatable arm 12 to operate in a predetermined plane for positive and accurate workpiece placement in the recipient machine.

Operation

When the arm and its attached pickup head 14 are located directly above the table 8, air is introduced into the lower portion of a cylinder 16 mounted on the arm 6 directly below the table 8. The inflow of air pushes a piston 17 (FIG. 8), the cylinder and its attached table upward until the uppermost piece in the stack of workpieces M (shown in phantom lines) is sensed by the pickup head 14. Upon receipt of a signal (later described) that the pickup head has gained control of the uppermost piece of material, the lower portion of the cylinder 16 is vented to the atmosphere and air under pressure is admitted to the upper end of this cylinder. The table is now driven by piston 17 to its lowermost position where it will remain until the arm 12 and its attached pickup 14 are returned to the "home" position above the table and ready to pick up another piece of material.

Referring to FIG. 2, a plan view of the automatic feeding mechanism and an operating mechanism 18 for the arm 12 can best be seen. The arm operating mechanism comprises generally an operating cylinder 20 and a dampening cylinder 22. The dampening cylinder prevents repeated jarring or irregular motions of the arm 12. The solid lines of this figure show the arm 12 and its pickup head 14 in the "home" position, i.e., above a stack of workpieces M (in the case shown as a part of a shoe upper) and in phantom or broken lines in its workpiece delivering position at which point the control of material M is yielded to a recipient machine 24.

Pickup head

FIG. 3 which is a cross-sectional view of the illustrative pickup head 14 along lines III—III of FIG. 2 shows said head in contact with a workpiece M. The head comprises three elements, a unitary molded front portion 26 which contains both a pneumatic sensing device formed by an integral tube 28 and a vacuum port 30. The vacuum and air stream for the pickup head and pneumatic sensing device, respectively, are conducted to the forward portion 26 through a unitary molded rearward portion 32 which includes appropriate attachments for the sensing and vacuum sources and an outwardly extended tab 34 used in attaching the head to the pickup arm.

Pickup arm driving motor

Figure 4:
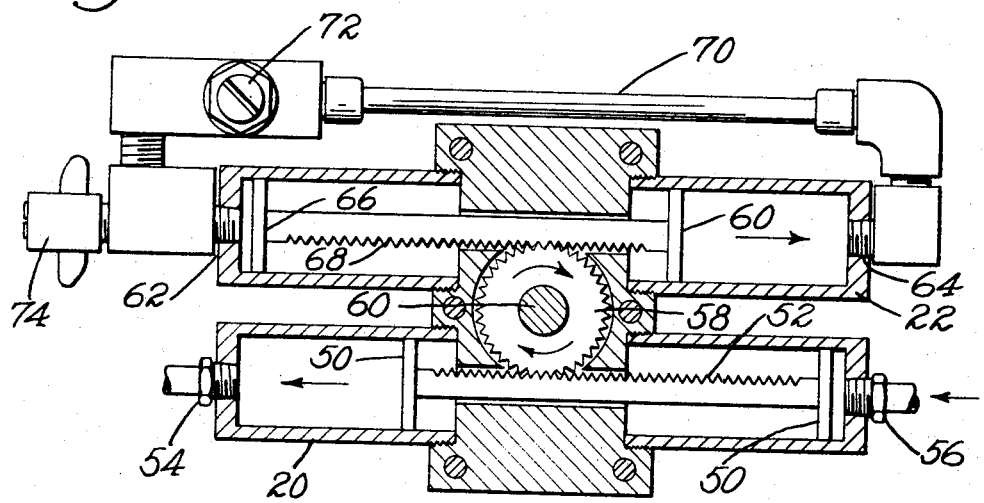
FIG. 4 is a view in horizontal section through the arm driving means on an enlarged scale.

As generally referred to above, the pickup arm driving motor, see FIG. 4, comprises a pair of air cylinders 20 and a pair of damping cylinders 22. The air cylinders 20 house a pair of pistons 50 connected by a rack 52. The cylinders have ports 54, 56 so that when fluid under pressure is introduced into one port, the pistons will move in one direction and vice versa. Intermeshing with the rack 52 is a pinion 58, which is secured to a vertical shaft 60 on which the arm 12 is mounted so that rotation of the pinion 58 by movement of the pistons 50 will cause a corresponding swinging movement of the arm 12.

To assure smooth continuous motion of the arm without a jarring action which would cause the piece of carried material to be dropped, the damping cylinders 22 have also been included. The damping cylinders have ports 62, 64, and house a pair of pistons 66 connected by a rack 68 intermeshing with the teeth of the pinion 58. The ports of the cylinder 22 are joined by means of a closed circuit 70 including a restricting means indicated generally by reference character 72, see also FIG. 8, and a bleeder valve 74.

Work supporting table

Figure 6:
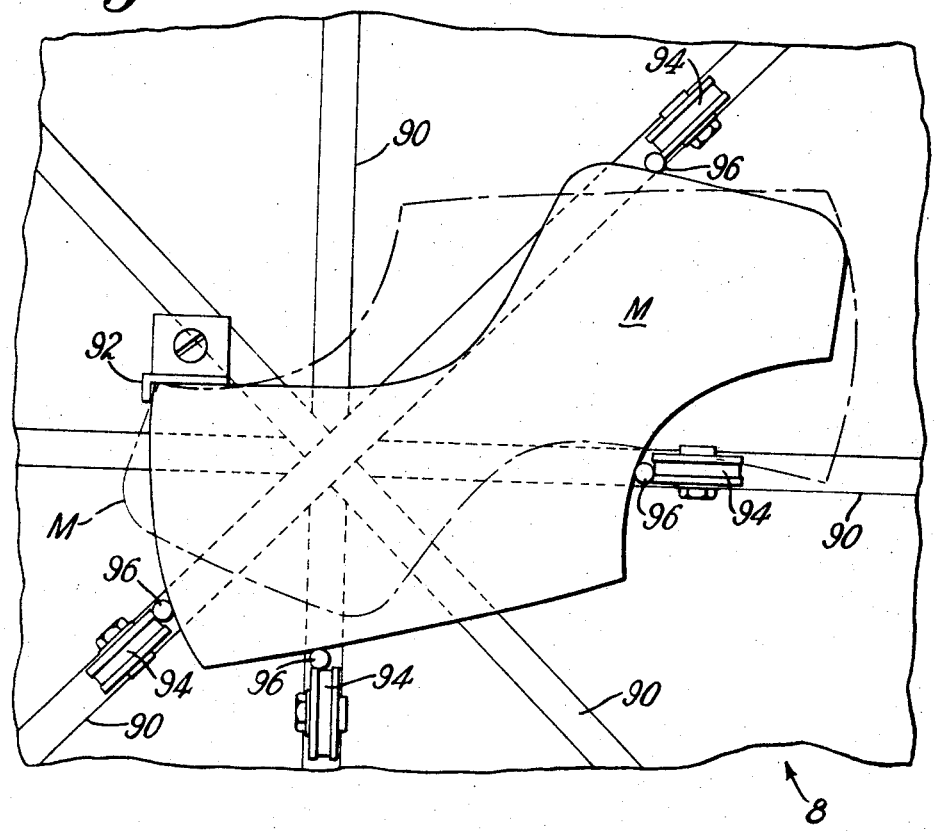
FIG. 6 is a plan view of the table showing the easily adjustable stack supporting and locating means.
Figure 7:
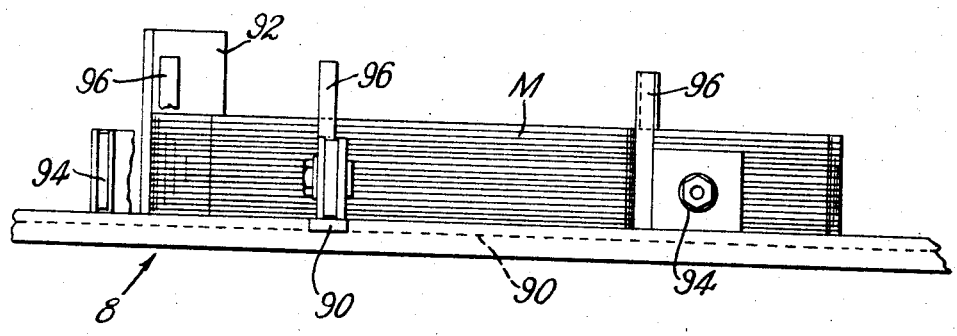
FIG. 7 is an elevation of the table including a stack of material.

Since the mechanism is designed to handle a stack of flat workpieces of various unrestricted shapes, it is necessary that the table be of a construction which allows rapid and easy adjustment of means for supporting and orienting a stack of flat pieces. In the illustrative mechanism, this particular problem was solved through the use of a table primarily constructed of wood but having radial strips of metal 90 inlaid in its upper surface. Although a permanent orienting means 92 has been provided for particular use with workpieces comprising shoe upper parts and is shown in the figure, it is not a necessary element. The remainder of the stack support is provided by magnets 94 having rigidly associated upstanding posts 96 which provide locating means for a stack of workpieces M. It is apparent that this type of support means allows rapid changes to accommodate a stack of workpieces of a different shape or to accommodate a stack of similarly shaped pieces in a different orientation, see phantom lines of FIG. 6.

The recipient machine

Figure 5:
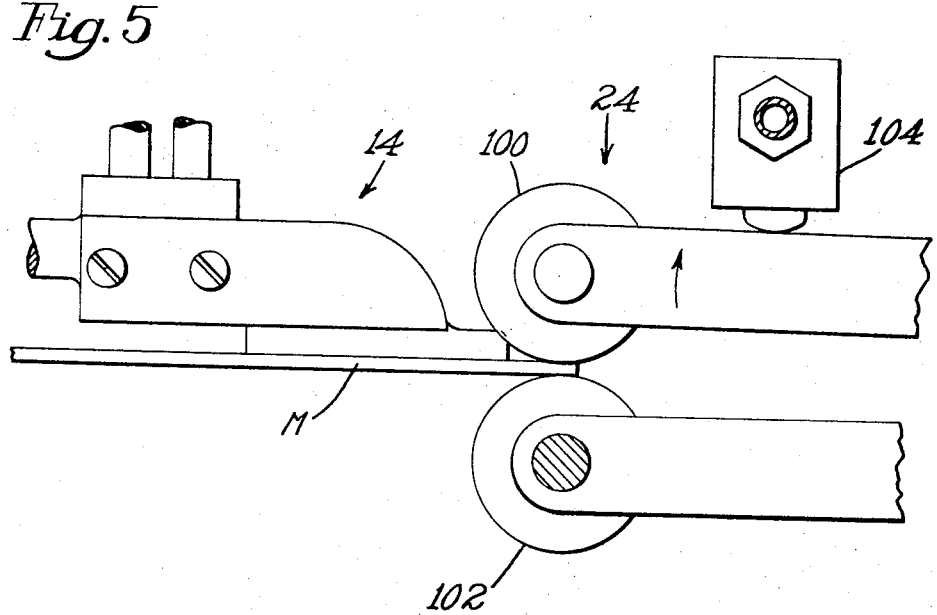
FIG. 5 is an enlarged view showing the pickup head in conjunction with the receiving means of the machine.

For purposes of illustration, the novel workpiece feeding mechanism is shown associated with a machine having a pair of upper and lower workpiece feeding rolls 100, 102, FIG. 5. The upper roller is mounted for movement, against a yieldable means, not shown, thus to receive a workpiece M presented thereto. Such upward movement of this roll actuates a sensing device 104. As will be explained below, this device senses the presence of a workpiece between the rolls, or absence therefrom, and provides a signal for the pneumatic control system.

Circuit diagram

Since the automatic feeding mechanism is designed to have general application, the power source is adapted to be received from a standard factory compressed air supply through line A (FIG. 8) which then passes through a series of pressure reducing elements R1, R2, R3 depending upon the pressure needed for the various control elements. In the illustrative mechanism the air will pass through reducers R1, R2 and then be fed into a line A1 which is the power source for both the reciprocable table 8 and the pivotal arm motor 18. With the circuit as shown in FIG. 8 (arm 12 in the "home" position), the air under relatively high pressure passes through line A1 through a pilot operated valve V1 and into the upper portion of the cylinder 16 maintaining the table 8 in its lowermost position. Likewise air in A1 passes through a pilot operated valve V2 to cylinders 20 holding the pivotal arm in its "home" position, pistons 50 being in their lowermost position and arm 12 shown in "home" position (i.e. above table 8). Note that pistons 66 in cylinders 22 are shown in their uppermost positions and that these cylinders have their outer ends joined by a closed circuit hydraulic line 70 including a one-way valve and a variable restriction unit 72.

The air in the pneumatic control circuit passes through pressure reducer R1 and then through another pressure reducer R3 to a line A2, said circuit requiring a much lower pressure than that in A1. The main control element of this circuit is a manually operable off-on valve V3 shown in its off position. When the valve V3 is in its off position, pneumatic flow passes through port P1 of fluidic element F1, causing the air under pressure received through port P5 to exit through port P4 of the same fluidic element F1. The fluid flow through P4 causes valve V1 to remain in its uppermost position, retaining the piston 17 in cylinder 16 and table 8 in their lowermost positions.

Air pressure applied through a control circuit B2 keeps a pilot operated vacuum control valve V4 in its lowermost or off position and also provides a constant air flow through a sensing device 28 until the outlet port is closed. Pressure from line A2 also flows into a control circuit B3, and since an off-on valve V5 is now in its normally closed position, the pressure flows through a port P6 of a fluidic element F2 and forces the pressure received through port P9 of the fluidic element to exist through port P8 of the same fluidic element. The fluid flow through port P8 by means of a control circuit B4 applies pressure through port P12 of a fluidic element F3. Pressure from line A2 likewise passing through control circuit B5 is vented to the atmosphere through a valve V7 for reasons to be explained later. Pressure from line A² further enters fluidic elements F3 through port P10 and exists through a port P14 since there is pressure at port P12 as explained above. The flow through port P14 assures that valve V2 will stay in its uppermost position and the pickup arm 12 will remain above the table at its "home" position.

To begin operation, valve V3 is moved to the on position and fluid pressure is now vented through valve V6 discontinuing the flow through port P1 of fluidic element F1. The cessation of flow through port P1 causes fluid flow to switch from port P4 to port P3 of the same fluidic element. The flow through port P3 acting through a control circuit B6 moves valve V1 to its lowermost position, allowing pressure to be applied to the lower portion of cylinder 16 and venting the upper portion, and thus causing the piston 17 in this cylinder to move up and raise the table 8.

When the table 8 reaches its uppermost position the top piece of the stack on the table closes the sensing device 28 of the pickup head 14 thus impeding fluid flow in control circuit B2 and moving valve V4 downward to its on or open position. The opening of valve V4 allows air to flow toward a vacuum source V through line A4, creating negative pressure at pickup head 14, thus causing the uppermost workpiece of the stack to be picked up by head 14. When the vacuum outlet of the pickup head 14 is closed by the uppermost workpiece the negative pressure in line A4 causes a valve V5 to move to its spring biased position which vents a control circuit B3.

The venting of control circuit B3 causes the fluid flow formerly passing through port P8 of fluidic element F2 to switch to port P7. The fluid flow through P7 passes through a control circuit B7 applying pressure to port P2 of fluidic element F1, causing the fluid flow previously passing through port P3 to move to port P4. The fluid flow through port P4 reverses valve V1, causing the table to move to its lowermost position.

The removal of fluid flow through port P8 of fluidic element F2 releases pressure from port P12 of a fluidic element F3. When the table reaches its lowermost position it cams a valve V7 to its vent position, releasing pressure from port P11 of fluidic element F3. With no fluid flow through port P11 or P12, the fluid flow through port P10 passes through port P13 of fluidic element F3 reversing valve V2. The reversal of valve V2 moves pistons 50 in cylinders 20 to their uppermost position and causes the rotatable arm 12 to move from its "home" position toward the element receiving means. As the arm 12 leaves the "home" position, a spring biased valve V6 moves to its uppermost or closed position causing fluid flow through P1 assuring that table 8 remains in its lowermost position as explained above.

When the element receiving means detects that it has control of the piece through sensing device 104, the flow of fluid through A2 is restricted and forced to flow through control circuit B8, causing valve V4 to reverse its position. The reversal of valve V4 turns off the vacuum to the pickup head thereby releasing the workpiece M to the recipient machine and allowing valve V5 to return to its vented position. The release of flow in control circuit B3 removes fluid flow through port P6 of fluidic element F2, allowing fluid to pass from port P8 to port P7 of the same fluidic element. This switch in fluid flow causes the rotatable arm 12 to return to its "home" position again venting valve V6 and leaving the apparatus in proper position to recycle. The foregoing operating cycle is repeated so long as there is a workpiece on the table to be picked up. When the arm and pickup head return to "home" position, after feeding the last workpiece to the recipient machine, the table rises to a predetermined upper limit where it remains until the operator moves valve V3 to the closed position. The table now moves downwardly and stops at its lower position for the reception of a new stack of workpieces. The dropping of a workpiece in transport likewise causes the mechanism to recycle.

It will be understood that the particular machine embodying the invention is shown by way of illustration only and not as a limitation of the invention. The principles and features of this invention may be employed in varied and numerous embodiments without departing from the scope of the invention.

Having thus described our invention, what we claim as new and desire to secure by Letters Patent of the United States is:

1. Mechanism for feeding workpieces, one by one, from a stack of workpieces to a recipient machine comprising, a work table for supporting a stack of workpieces mounted for reciprocating movement from a first to a second position, means for reciprocating the table, a pickup device mounted for movement from a workpiece receiving position directly in line with the table to a workpiece delivering position adjacent to the recipient machine, means for so moving the pickup device, means for controlling the work table reciprocating means and the pickup moving means in predetermined sequence to cause the table to move to present the uppermost workpiece to the pickup device, the pickup device to pick up the said uppermost workpiece, the table to move away from the pickup device, the pickup device to move to workpiece delivering position and to release the workpiece and the pickup device to return to workpiece receiving position to complete an operating cycle, said control means including a plurality of sensing devices responsive respectively, to contact of a workpiece with the pickup device, movement of the table, movement of the pickup device and the reception of the workpiece by the machine.

2. Mechanism as in claim 1 wherein the work table is mounted for vertical reciprocating movement from a lower to an upper position and wherein the pickup device is mounted for movement in a horizontal plane.

3. Mechanism as set forth in claim 1 wherein the means for reciprocating the table and the means for moving the pickup arm each comprise a fluid pressure actuated motor and wherein said control means also includes a reversing valve associated with each motor and a plurality of control elements responsive to signals from said sensing devices for actuating said valves.

4. A machine as set forth in claim 3 wherein said control elements comprise fluidic devices.

5. Mechanism as set forth in claim 1 wherein the pickup device is of the vacuum operated type.

6. Mechanism as set forth in claim 1 wherein the sensing device responsive to contact of the workpiece with the pickup device comprises an orifice opening through the operating face of the pickup device and means for connecting the orifice to a source of fluid under pressure.

7. Mechanism for feeding workpieces from a stack of workpieces to a recipient machine comprising a pickup device, means for actuating the pickup device, a work table for supporting a stack of workpieces mounted for reciprocating movement from a position remote from the pickup device to a position in which the uppermost workpiece contacts the pickup device, means for reciprocating the work table and means for controlling the table reciprocating means and the pickup actuating means including a sensing device associated with the pickup device and responsive to contact of a workpiece therewith for actuating the pickup device and causing the table to return to its remote position.

8. Mechanism as set forth in claim 7 wherein the work table is mounted for vertical reciprocating movement.

9. Mechanism as set forth in claim 7 wherein the means for reciprocating the table comprises a fluid pressure actuated motor and wherein the control means includes valves associated with said motor and with the pickup actuating means and a plurality of control elements responsive to signals from said sensing device for actuating said valves.

10. Mechanism as set forth in claim 9 wherein said control elements comprise fluidic devices.

11. Mechanism as set forth in claim 7 wherein the pickup device is of the vacuum operated type.

12. Mechanism as set forth in claim 7 wherein the sensing device comprises an orifice opening through the operating face of the pickup device and means for connecting the orifice to a source of fluid under pressure.

References Cited

UNITED STATES PATENTS

| | | | |
|---|---|---|---|
| 876,987 | 1/1908 | Molinar | 271—5 |
| 2,150,279 | 3/1939 | Jorgensen | 12—61.3 |

HUGO O. SCHULZ, *Primary Examiner.*

G. F. ABRAHAM, *Assistant Examiner.*